United States Patent
Tokuyoshi

(10) Patent No.: US 9,595,133 B2
(45) Date of Patent: Mar. 14, 2017

(54) INFORMATION PROCESSING APPARATUS, CONTROL METHOD, AND STORAGE MEDIUM FOR DEFINING TILES WITH LIMITED NUMBERS OF FRAGMENTS

(71) Applicant: SQUARE ENIX CO., LTD., Tokyo (JP)

(72) Inventor: Yusuke Tokuyoshi, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 74 days.

(21) Appl. No.: 14/625,040

(22) Filed: Feb. 18, 2015

(65) Prior Publication Data
US 2015/0310661 A1    Oct. 29, 2015

(30) Foreign Application Priority Data

Apr. 25, 2014    (JP) .................................. 2014-091918

(51) Int. Cl.
G06T 15/50    (2011.01)
G06T 15/06    (2011.01)

(52) U.S. Cl.
CPC .............. *G06T 15/50* (2013.01); *G06T 15/06* (2013.01)

(58) Field of Classification Search
None
See application file for complete search history.

(56) References Cited

PUBLICATIONS

Diaz et al., "Real-time ambient occlusion and halos with Summed Area Tables," Elsevier, 2010.*
Yusuke Tokuyoshi et al., "Fast Global Illumination Baking via Ray-Bundles", SIGGRAPH Asia, Technical Sketches, pp. 1-2 (2011).
Nicolas Thibieroz, "Order-Independent Transparency using Per-Pixel Linked Lists", GPU Pro 2, A K Peters, VII-2, pp. 409-431 (Mar. 11, 2011).
Yusuke Tokuyoshi et al., "Adaptive Ray-bundle Tracing with Memory Usage Prediction: Efficient Global Illumination in Large Scenes", Computer Graphics Forum, vol. 32, No. 7, pp. 1-10 (2013).
Justin Hensley et al., "Fast Summed-Area Table Generation and its Applications", EUROGRAPHICS, vol. 24, No. 3, pp. 1-9 (2005).
Extended European Search Report from European Patent Office (EPO) issued for European Patent Appl. No. 15156821.9, dated Nov. 27, 2015.

(Continued)

*Primary Examiner* — Kee M Tung
*Assistant Examiner* — Nicholas R Wilson
(74) *Attorney, Agent, or Firm* — Greenblum & Bernstein, P.L.C.

(57) ABSTRACT

An information processing apparatus obtains a number of fragments existing on a straight line defined by each pixel of a rectangular image into which a 3D scene is to be rendered for a predetermined viewpoint and a viewpoint, and divides a two-dimensional region in a screen coordinate system corresponding to the rectangular image into a plurality of regions which are processing units for which a predetermined calculation is performed. The apparatus divides the two-dimensional region into different regions by one or more straight line such that a difference in summations of the numbers of fragments included in the regions after the division becomes a minimum.

15 Claims, 6 Drawing Sheets

(56) References Cited

PUBLICATIONS

Jacco Bikker, "Real-time Ray Tracing through the Eyes of a Game Developer", Interactive Ray Tracing, 2007. RT '07. IEEE Symposium on, IEEE, PI, XP031142278, pp. 1-10 (Sep. 1, 2007).
Wikipedia: "K-d tree", XP002751009, pp. 1-5, (Apr. 24, 2014), retrieved from the Internet: URL:https://en.wikipedia.org/w/index.php?title=K-d_tree&oldid=605610478, retrieved on: Nov. 16, 2015.

\* cited by examiner

FIG. 4A

| 16 | 30 | 6 | 20 | 10 |
|---|---|---|---|---|
| 17 | 28 | 2 | 0 | 17 |
| 10 | 9 | 2 | 14 | 21 |
| 0 | 43 | 21 | 11 | 0 |
| 26 | 18 | 13 | 19 | 5 |

| 16 | 46 | 52 | 72 | 82 |
|---|---|---|---|---|
| 17 | 45 | 47 | 47 | 64 |
| 10 | 19 | 21 | 35 | 56 |
| 0 | 43 | 64 | 75 | 75 |
| 26 | 44 | 57 | 76 | 81 |

FIG. 4C 402 403

| 16 | 46 | 52 | 72 | 82 |
|---|---|---|---|---|
| 33 | 91 | 99 | 119 | 146 |
| 43 | 110 | 120 | 154 | 202 |
| 43 | 153 | 184 | 229 | 277 |
| 69 | 197 | 241 | 305 | 358 |

404 405

INFORMATION PROCESSING APPARATUS, CONTROL METHOD, AND STORAGE MEDIUM FOR DEFINING TILES WITH LIMITED NUMBERS OF FRAGMENTS

BACKGROUND OF THE INVENTION

Field of the Invention

The present invention relates to an information processing apparatus, a control method, and a storage medium, and particularly to a 3D scene rendering technique.

Description of the Related Art 3D graphics are used as a visualization expression method in various fields and are not limited to game, movies, or the like. In such 3D graphics fields, in recent years, various approaches to approximating more realistic depiction or more high quality rendering expression have been proposed.

One approach for causing the realism of 3D graphics to improve is a Global Illumination approach in which an illumination in which light emitted from a light source reflects a plurality of times and diffuses, such as in an indirect illumination, is caused to be reflected. By such an approach, it is possible to provide a rendering expression that has a greater realism by rendering shadows for one rendering object by not only rendering shadows that occur directly due to defined illumination (a light source) but also by considering indirect illumination that appears due to the light source being reflected by another rendering object.

There are various approaches for analyzing influences of Global Illumination, but in recent years, an approach for performing an analysis by using a GPU for which concurrent calculation capabilities are superior has been proposed. In a ray-bundle tracing approach, an incident radiance is obtained by defining a collection of parallel rays (ray-bundle) by selecting a sampling direction in relation to a 3D scene which is an analysis target, and analyzing reflections between rendering objects lined up in a depth direction on each ray. Here, because there are cases in which a plurality of rendering objects exist on a ray, there are cases in which a plurality of fragments exist for a single ray, and inter-reflections in a plurality of sections defined by consecutive fragments are analyzed. In Yusuke Tokuyoshi et al, "Fast Global Illumination Baking via Ray-Bundles", SIGGRAPH Asia 2011 Technical Sketches, each section on a ray is associated using a linked-list in order to consider the sections defined by the fragments existing on this kind of single ray.

Note, it is possible to use a linked-list as is used in "Fast Global Illumination Baking via Ray-Bundles" for OIT (Order-Independent Transparency). OIT is a 3D graphics rendering approach in which it is possible to realize an alpha-blending representation irrespective of an alpha-blending representation rendering order, i.e. without performing rendering in order in a viewpoint direction from a deepest object rendered in the alpha-blending representation. In such a case, the fragments existing on the respective straight line that extends in a direction from the viewpoint for each pixel of a two-dimensional image rendered for the viewpoint can be configured as a linked-list for each pixel.

However, in a case where a linked-list is used in this way there are pieces of information whose number is greater than or equal to the total pixel count because a plurality of fragments are included in a single pixel of a map of an analysis target or an image that is rendered. In other words, in a case where a summation of a number of fragments is large, there is a possibility that it will not be possible to contain all of the information of the processing target within a limited memory region that is used for the processing. In response to this, an approach of dividing a region of a two-dimensional image to be rendered into grid shaped tiles having uniform size, and performing rendering processing on each of the divided tiles (tiling) is disclosed in Nicolas Thibieroz, "Order-Independent Transparency using Per-Pixel Linked Lists", GPU Pro 2, A K Peters, Mar. 11, 2011, VII-2, pp. 409-431. Also, an approach of performing tiling by estimating the number of fragments within a region and adaptively modifying the tile size so that a memory overflow does not occur is disclosed in Yusuke Tokuyoshi et al, "Adaptive Ray-bundle Tracing with Memory Usage Prediction: Efficient Global Illumination in Large Scenes", Computer Graphics Forum 2013.

However, in the tiling approach recited in "Adaptive Ray-bundle Tracing with Memory Usage Prediction: Efficient Global Illumination in Large Scenes", for a map that is a target of the tiling, a determination as to whether or not to perform a Quadtree-based tile division is performed considering an affinity with the GPU and convenience for use in referencing in analysis processing. In other words, this is something that is constrained to square images having pixels of a number that is a power of 2 in each direction in a case where it is determined that dividing is performed for a particular size of tile, because the configuration is such that division into 4 tiles is performed by dividing the tile into 2 in a horizontal direction and into 2 in a vertical orientation. In other words, this is not an approach that assumes processing of a rectangle region of any aspect ratio.

SUMMARY OF THE INVENTION

The present invention was made in view of such problems in the conventional technique. The present invention provides an information processing apparatus, a control method, and a storage medium that performing suitable tiling considering the number of fragments for a rectangle region having any aspect ratio.

The present invention in its first aspect provides an information processing apparatus that generates a rectangular image into which a 3D scene is rendered for a predetermined viewpoint, the apparatus comprising: an obtainer which is able to obtain a number of fragments existing on a straight line defined by the viewpoint and a predetermined point within the 3D scene to be rendered for each pixel of the rectangular image; a divider which is able to divide a two-dimensional region in a screen coordinate system corresponding to the rectangular image into a plurality of regions; and a calculator which is able to perform a predetermined calculation where each of the plurality of regions is taken as one unit of calculation, wherein the divider divides the two-dimensional region into the plurality of regions by one or more dividing line so that a difference of summations of the number of fragments included in each of the regions after the division becomes a minimum.

The present invention in its second aspect provides an information processing apparatus that generates a rectangular image into which a 3D scene is rendered for a predetermined viewpoint, the apparatus comprising: an obtainer which is able to obtain a number of fragments existing on a straight line defined by the viewpoint and a predetermined point within the 3D scene to be rendered for each pixel of the rectangular image; a divider which is able to divide a two-dimensional region in a screen coordinate system corresponding to the rectangular image into a plurality of regions; and a calculator which is able to perform a predetermined calculation where each of the plurality of regions is taken as one unit of calculation, wherein the divider divides the two-dimensional region into the plurality of regions by one or more dividing line so that a difference of summations of the number of fragments included in each of the regions after the division becomes less than or equal to a predetermined value.

The present invention in its third aspect provides a control method of an information processing apparatus that generates a rectangular image into which a 3D scene is rendered for a predetermined viewpoint, the apparatus comprising: obtaining a number of fragments existing on a straight line defined by the viewpoint and a predetermined point within the 3D scene to be rendered for each pixel of the rectangular image; dividing a two-dimensional region in a screen coordinate system corresponding to the rectangular image into a plurality of regions; and performing a predetermined calculation where each of the plurality of regions is taken as one unit of calculation, wherein in the dividing, the two-dimensional region is divided into the plurality of regions by one or more dividing line so that a difference of summations of the number of fragments included in each of the regions after the division becomes a minimum.

The present invention in its fourth aspect provides a control method of an information processing apparatus that generates a rectangular image into which a 3D scene is rendered for a predetermined viewpoint, the apparatus comprising: obtaining a number of fragments existing on a straight line defined by the viewpoint and a predetermined point within the 3D scene to be rendered for each pixel of the rectangular image; dividing a region two-dimensional region in a screen coordinate system corresponding to the rectangular image into a plurality of regions; and performing a predetermined calculation where each of the plurality of regions is taken as one unit of calculation, wherein in the dividing, the two-dimensional region is divided into the plurality of regions by one or more dividing line so that a difference of summations of the number of fragments included in each of the regions after the division becomes less than or equal to a predetermined value.

Further features of the present invention will become apparent from the following description of exemplary embodiments (with reference to the attached drawings).

BRIEF DESCRIPTION OF THE DRAWINGS

FIGS. 4A, 4B and 4C are views for explaining a summed area table that is constructed by the rendering processing of embodiments of the present invention.

DESCRIPTION OF THE EMBODIMENTS

First Embodiment

Exemplary embodiments of the present invention will be described hereinafter in detail, with reference to the accompanying drawings. Note, for the embodiments explained below, explanation is given with an example in which the present invention is applied to a PC capable of generating a rectangular image into which a target scene is rendered for a predetermined viewpoint, which is an example of an information processing apparatus. However, the present invention is applicable to any device capable of generating a rectangular image into which a target scene is rendered for a predetermined viewpoint.

<PC 100 Configuration>

Figure 1:
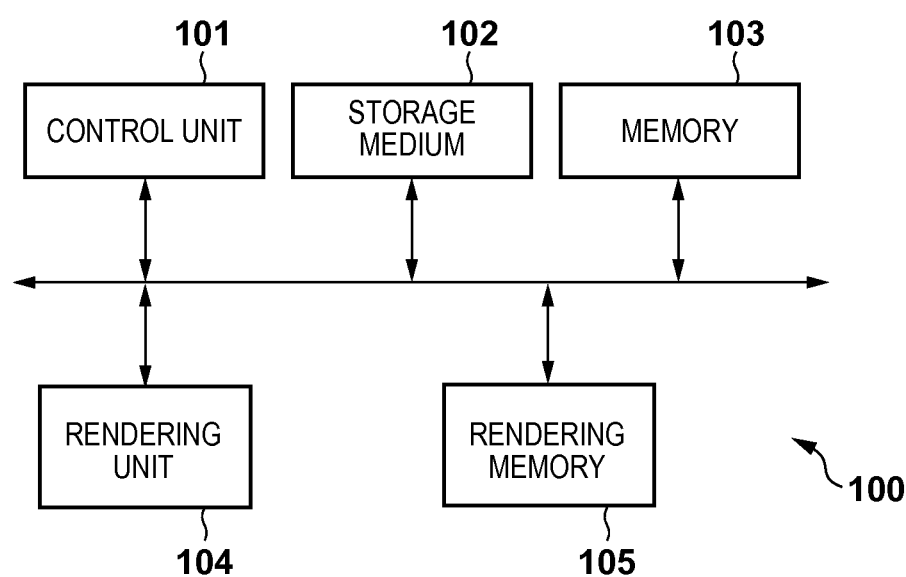
FIG. 1 is a block diagram for showing a functional configuration of a PC 100 according to embodiments of the present invention.

FIG. 1 is a block diagram for showing a functional configuration of a PC 100 according to embodiments of the present invention.

A control unit 101 is, for example, a CPU, or the like. The control unit 101 controls operation of blocks that the PC 100 has. More specifically, the control unit 101 controls operation of the blocks by reading out operation programs of the blocks stored in a storage medium 102, loading the operation programs into a memory 103, and executing the operation programs.

The storage medium 102 is a storage apparatus such as a non-volatile memory, an HDD, or the like. The storage medium 102 stores not only the operation programs of the blocks that the PC 100 has, but also parameters, or the like, which are necessary in the operation of the blocks. Also, the storage medium 102 stores various data of rendering objects arranged in a 3D scene which is a target of generation in later described rendering processing (target scene). Also, the memory 103 is a volatile memory such as a RAM. The memory 103 is not only used as a loading region for operation programs of the blocks, but also stores intermediate data, or the like, which is outputted in the operation of the blocks.

A rendering unit 104 is, for example, a rendering apparatus such as a GPU, or the like. The rendering unit 104 performs processing such as translation, rotation, or the like, based on predetermined parameters, on data of rendering objects loaded into a rendering memory 105, for example. The rendering unit 104 generates an image by rendering the target scene in accordance with information of a viewpoint that is set (position, direction, angle of view, upward direction, or the like) using data of the rendering objects after the processing. The generated image is a rectangular shape having an aspect ratio that is set or a number of pixels that is set, and the number of pixels need not be constrained to a power of 2.

<Tile Division by Kd-Tree>

Next, explanation will be given for theory behind processing, for tiling a two-dimensional region in a screen coordinate system of a target scene rendered for a viewpoint that is set, which is performed in the PC 100 of the present embodiment having this kind of configuration.

Figure 2A:
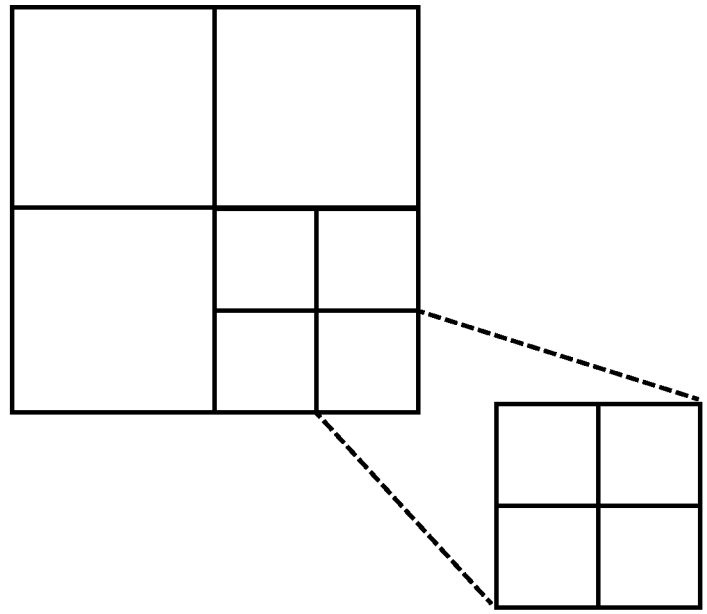
FIGS. 2A and 2B are views for explaining tile division by a kd-tree which is used in embodiments of the present invention.
Figure 2B:
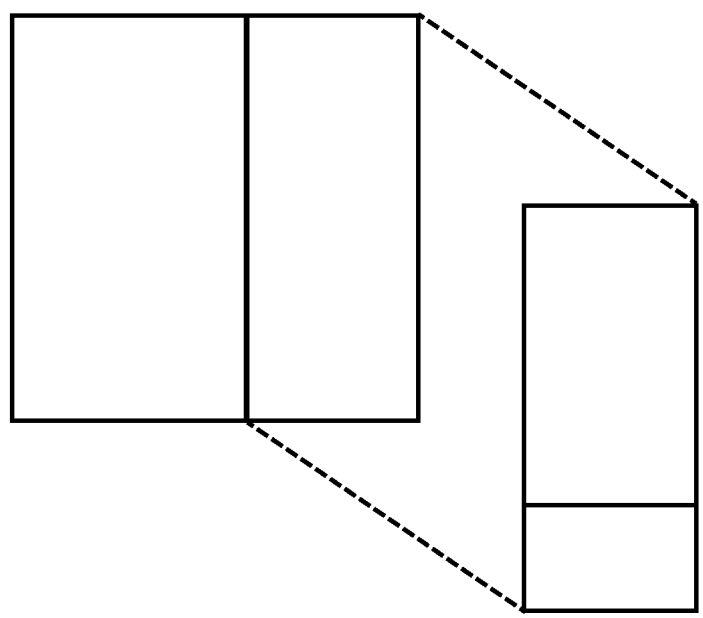

In the tiling processing of the present embodiment, a search is performed while determining a position at which a straight line for a division is defined using a kd-tree rather than a Quadtree, which has been used conventionally. While for a Quadtree, as shown in FIG. 2A, a search is performed by dividing one element equally into four elements, for a kd-tree the search is performed by dividing one element into two elements as shown in FIG. 2B. Here, for the kd-tree, it is not necessary to divide so that the elements after the division have equal sizes, and the search is performed by dividing into division surfaces that are perpendicular to either axis (a straight line).

It is assumed that in the tile division of the present embodiment the straight line for dividing the two-dimensional region in the screen coordinate system of the target scene is successively defined so that a difference in the numbers of fragments included in the two regions (tiles) divided by the straight line becomes a minimum. In other words, when a tile which is a division target is divided by a straight line perpendicular to an axis that is established in advance, the tile division is performed by successively defining the straight line for dividing the tiles which are the division targets such that the numbers of fragments included in the two tiles after the division is as close to equal as possible.

The tile division is performed until the number of fragments is less than or equal to a number that is storable in a storage region for rendering processing in the rendering memory 105 for all of the tiles. In other words, the tile division is performed such that ideally summations of the number of fragments that exist on straight lines defined by each pixel within a tile and the viewpoint are approximately equal for all tiles, and the amount of data for each tile fits into an amount that is storable in the rendering memory 105.

<Rendering Processing>

Figure 3:
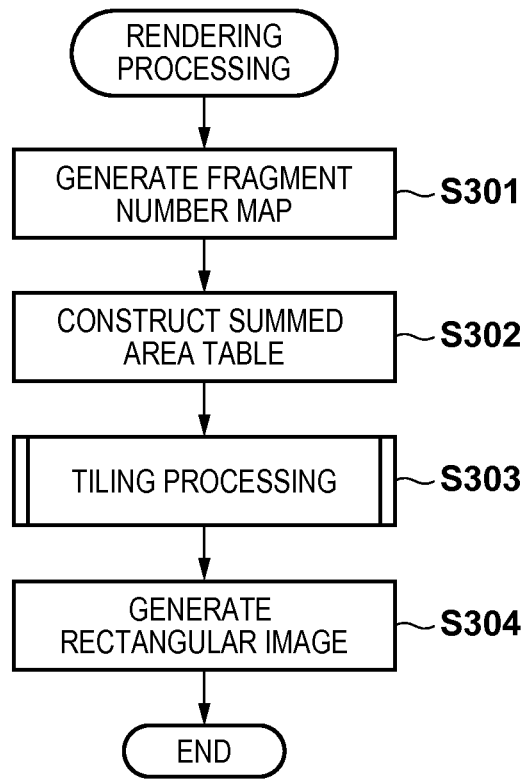
FIG. 3 is a flowchart for showing an example of rendering processing executed by the PC 100 according to a first embodiment of the present invention.

Below, explanation will be given for specific processing using the flowchart of FIG. 3 for the rendering processing executed on the PC 100 of the present embodiment including the tiling processing using a binary search by a kd-tree. The processing corresponding to this flowchart can be realized by the control unit 101 reading out a corresponding processing program that is stored in the storage medium 102, for example, loading the processing program into the memory 103, and executing the processing program. Note, the rendering processing will be explained as something that is initiated when viewpoint information for rendering the target scene, for example, is determined, and an instruction for generating a rectangular image is performed. Also in the explanation below, explanation is given having a rectangular image be generated by rendering in accompaniment of semi-transparency processing by OIT on the target scene and at least one of the rendering objects arranged in the scene.

In step S301, the control unit 101, based on determined viewpoint information, causes the rendering unit 104 to generate a fragment number map for a corresponding perspective. The fragment number map is a two-dimensional map having identical number of pixels as the rectangular image, and is obtained by counting the numbers of fragments existing on straight lines defined by a predetermined point within the target scene to be rendered for each pixel of the rectangular image which is to be generated by the rendering processing, and the viewpoint. Each pixel of the fragment number map may be generated using an Atomic instruction of the GPU, for example, after the information of the target scene in the range corresponding to the perspective from the viewpoint is constructed.

In step S302, the rendering unit 104 constructs a summed area table (SAT: Summed Area Table) from the fragment number map that is generated, and stores it in the memory 103, for example.

<Summed Area Table (SAT)>

Here, explanation will be given for a summed area table of an approach to generation and a use case in the rendering processing of the present embodiment.

The summed area table is two-dimensional information for calculating efficiently a summation of pixel values within an arbitrary rectangle of a two-dimensional image, and is disclosed in Hensley et al, "Fast Summed-Area Table Generation and its Applications", EUROGRAPHICS 2005. For example, for a fragment number map as shown in FIG. 4A, the generation of the summed area table is performed as follows. Firstly, a map, such as that of FIG. 4B in which the pixel value of each pixel of the fragment number map is converted into a value into which a summation of the pixel value of the pixel and the pixel values of pixels for which a horizontal coordinate is smaller than that of the pixel is performed, is generated. The summed area table as shown in FIG. 4C can be generated by further converting the pixel value of each pixel in that map into a value which is a summation of the pixel value of the pixel and the pixel values of the pixels for which a vertical coordinate is smaller than that of the pixel. In other words, the pixel value I(x, y) which is stored in the coordinate (x, y) of the summed area table, using the pixel value i(x, y) of the coordinate of the fragment number map which is the origin of the conversion, can be calculated as $$I(x, y) = \sum_{\substack{x' \leq x \\ y' \leq y}} i(x', y')$$

$$= i(x, y) + I(x-1, y) + I(x, y-1) - I(x-1, y-1)$$

By using the summed area table generated in this way, the summation value $S_{401}$ for the numbers of fragments included in a range 401 in FIG. 4A can be obtained. More specifically, the summation value, using the values of the positions corresponding to coordinates 402, 403, 404, and 405 in the summed area table shown in FIG. 4C can be calculated as $$S_{401} = \sum_{\substack{x_{402} < x \leq x_{403} \\ y_{402} < y \leq y_{404}}} i(x, y) = I_{402} - I_{403} - I_{404} + I_{405}$$

In other words, the summation value for the numbers of fragments within the range 401 in the example of FIG. 4 can be obtained by:

$$S_{401} = 28 + 2 + 0 + 17 + 9 + 2 + 14 + 21 + 43 + 21 +$$
$$11 + 0 + 18 + 13 + 19 + 5$$
$$= 16 - 82 - 69 + 358$$
$$= 223$$

In the present embodiment, because the numbers of fragments included in each tile after division can be calculated by the referencing of 4 values and addition and/or subtraction when performing the tiling by generating the summed area table for the fragment number map in advance, the computation amount can be reduced.

Additionally, in the present embodiment explanation is given having the tile division be performed using the summed area table with the object of reducing the computation amount, but working of the present invention is not limited to this. In other words, it should be easily understood that configuration may be taken such that in the approach to calculating the numbers of fragments included in the tiles after the division, the summed area table is not used, and direct calculation is performed by referencing the fragment number map, and other approaches may also be used.

In step S303, the control unit 101 performs tiling processing by referencing the summed area table. Note, in the present embodiment explanation is given having the control unit 101 perform the tiling processing, but the rendering unit 104 may perform the tiling processing.

<Tiling Processing>

Figure 5:
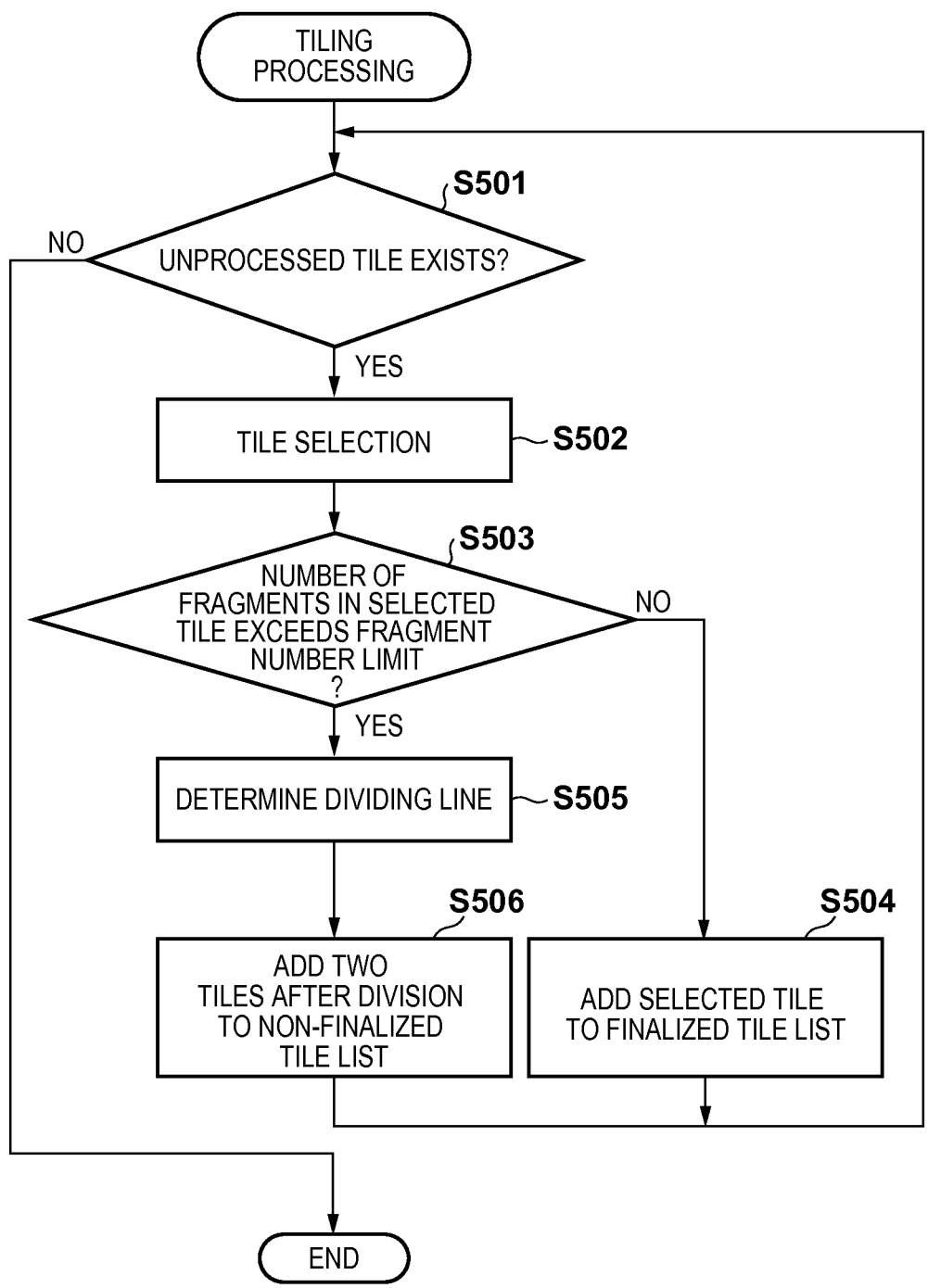
FIG. 5 is a flowchart for showing an example of tiling processing executed by the PC 100 according to embodiments of the present invention.

Below, detailed explanation will be given for the tiling processing of this step using the flowchart of FIG. 5. The tiling processing will be explained as something that sets an entire two-dimensional region in the screen coordinate system corresponding to the rectangular image to be generated as an initial tile which is unprocessed, and is initiated having added information of that tile to a non-finalized tile list.

In step S501, the control unit 101 determines whether or not there exists a tile that is unprocessed in the non-finalized tile list. The control unit 101, in a case where it determines that there exists a tile that is unprocessed in the non-finalized tile list, moves the processing to step S502, and in a case where it is determined that a tile that is unprocessed does not exist in the non-finalized tile list, terminates the tiling processing.

In step S502, the control unit 101 selects one tile that is unprocessed (selected tile) which is included in the non-finalized tile list. The tile which is unprocessed that is selected in this step is the initial tile upon processing initiation. Also, the control unit 101 deletes the information of the selected tile from the non-finalized tile list.

In step S503, the control unit 101 determines whether or not the number of fragments included in the selected tile exceeds the numbers of fragments that are storable in a predetermined region of the rendering memory 105 (fragment number limit). The control unit 101, using the summed area table, calculates a summation of the number of fragments included in the selected tile. Note, in a case where in the selected tile either a horizontal coordinate or a vertical coordinate includes a pixel which is 0, it is possible to obtain the summation value by calculating an out of range value not included in the summed area table as 0. The control unit 101 moves the processing to step S505 in a case where it determines that the number of fragments included in the selected tile exceeds the fragment number limit. Also, in a case where the control unit 101 determines that the number of fragments included in the selected tile does not exceed the fragment number limit, the control unit 101, in step S504, adds information of the tile to a finalized tile list and returns the processing to step S501.

In step S505, the control unit 101 determines a direction in which to divide the selected tile based on the aspect ratio of the selected tile (division direction), and determines a position that defines a straight line (dividing line) for dividing the selected tile into two tiles in a direction orthogonal to the direction. In the determination of the division direction, the division direction is determined to be the lengthwise direction of the selected tile. In other words, the division direction is determined such that the tiles after the division become closer to square shapes, and the control unit 101 performs the determination of the division direction by comparing the number of pixels in a horizontal direction and in a vertical direction of the selected tile. For example, in a case where for the selected tile, the number of pixels horizontally is 720 and the number of pixels vertically is 540, the control unit 101 determines the horizontal direction to be the division direction. Note, configuration may be taken such that either of the directions is made to be the division direction in a case where the selected tile is a square shape.

Also, the position that defines the dividing line (a coordinate for the division direction of the selected tile) may be determined by a bisection method making a minimum coordinate and a maximum coordinate in a lengthwise direction of the selected tile be initial values, for example. In such a case, the control unit 101 temporarily defines the dividing line to be at the midpoint of the minimum coordinate and the maximum coordinate, and calculates by the summed area table the numbers of fragments included in the tiles after the division when the tiles are divided by that dividing line. Then, a coordinate for which the difference in the numbers of fragments between the tiles after the division becomes a minimum is identified by updating either the minimum coordinate or the maximum coordinate in accordance with the size relationship with respect to the numbers of fragments, and that coordinate is determined to be the position that defines the dividing line. In other words, by the processing of this step, the position of the dividing line can be determined such that for the selected tile the difference in the numbers of fragments included in the tiles after the division becomes a minimum.

In step S506, the control unit 101 defines the dividing line at the determined position, and divides the selected tile into two different tiles by that straight line. Then, the two obtained tiles are added to the non-finalized tile list as unprocessed tiles, and the processing is returned to step S501.

By recursively performing each step of the tiling processing until all of the numbers of fragments included in the tiles are less than or equal to the fragment number limit in this way, the control unit 101 is able to set the tiles which are processing units to be rendered for the two-dimensional region in the screen coordinate system corresponding to the rectangular image to be generated.

In step S304, under the control of the control unit 101, the rendering unit 104 generates the rectangular image by performing the rendering processing. The rendering processing is performed by after selecting tiles defined in the finalized tile list by the tiling processing consecutively, generating a linked-list for these tiles, and performing sorting processing for each pixel, performing shading processing and rendering and outputting corresponding pixels for the rectangular image.

With such a configuration, it is possible to preferably perform tiling based on numbers of fragments even in a case where a target scene is rendered into a rectangular image for a predetermined viewpoint in the PC 100 of the present embodiment.

Note, in the present embodiment explanation was given having the processing for determining a dividing line in the tiling processing be performed so that the difference between the numbers of fragments included in the regions after the division becomes a minimum, but working of the present invention is not limited to this. In other words, configuration may be taken such that dividing is performed by a dividing line so that the difference in the numbers of fragments included in the regions after the division is less than or equal to a predetermined value, for example, because there is a possibility that time will be required for processing to proceed until a convergent solution of the bisection method can be obtained in a case where the number of pixels in the lengthwise direction of a tile is large.

Also, in the present embodiment, explanation was given having the dividing line be defined so as to be orthogonal to the horizontal axis or the vertical axis using a kd-tree considering efficiency of processing, but working of the present invention is not limited to this. Though the computation amount will become larger, the dividing line may be defined so that it is not limited to a horizontal direction and a vertical direction by using a BSP-tree, for example.

Also, in the present embodiment, explanation was given having the tiling processing be performed by recursively dividing tiles into two because a kd-tree is used, but working of the present invention is not limited to this. In a kd-tree, the tiles defined after the division are limited in number to two, but, for example, if the numbers of fragments included in the tiles is a number treated as being close to three times a limitation fragment number, configuration may be taken such that one tile is divided into three or more tiles by defining two dividing lines and dividing into three tiles, or the like.

Also, in the present embodiment, explanation was given having a single tile division be performed by setting a straight line that passes through a point on the two differing sides of the target tile to be the dividing line, but working of the present invention is not limited to this. The dividing line is not limited to a straight line, and configuration may be taken such that such that the dividing line is defined as a kinked straight line that bends at a predetermined angle part way through, for example, and configuration may be taken such that the dividing line is defined as a curved line.

As explained above, by virtue of the information processing apparatus of the present embodiment, it is possible to perform suitable tiling considering numbers of fragments for a rectangle region of an arbitrary aspect ratio.

Second Embodiment

In the above described first embodiment, because the number of pixels of the tiles defined by the tiling processing is determined in accordance with the positions that define the dividing lines, there is the possibility that tiles having a variety of numbers of pixels will be defined. Meanwhile, because it is possible that sorting processing performed in the rendering processing will be executed in parallel for a predetermined number of pixels (for example, 16×16), it is advantageous that the number of pixels within a tile be a multiple of a predetermined number. In other words, there is a possibility that in a tile of a number of pixels determined arbitrarily, sorting processing is performed setting a number of pixels that is less than the number for the concurrent processing to be the target. In the present embodiment, explanation will be given for an approach to performing the tiling processing so that the number of pixels is such that the rendering processing is optimized considering the concurrent processing capabilities of the rendering unit 104 in the rendering processing.

<Rendering Processing>

Figure 6:
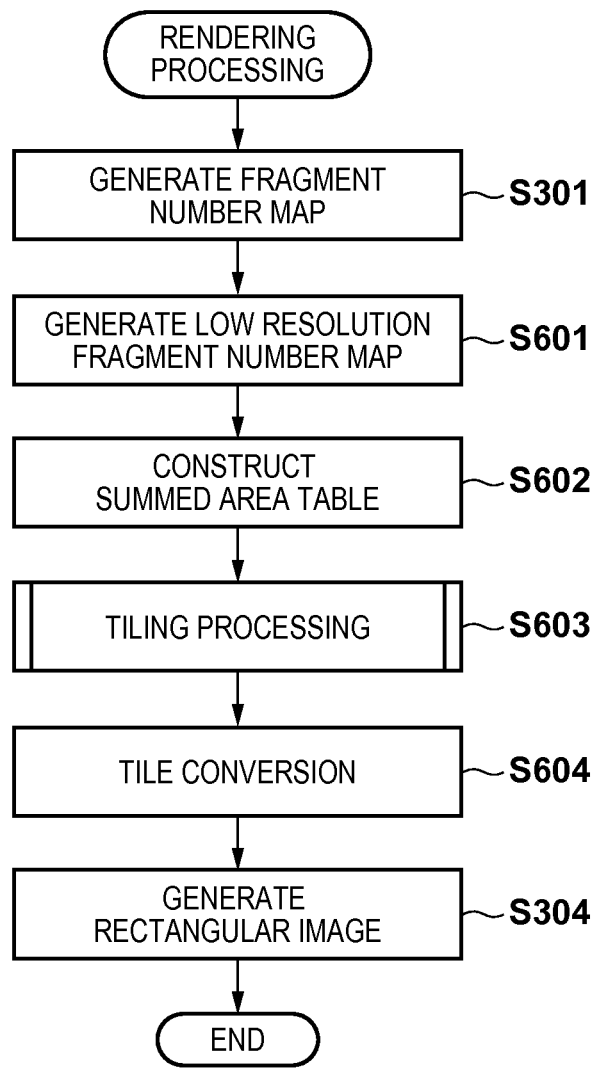
FIG. 6 is a flowchart for showing an example of rendering processing executed by the PC 100 according to the second embodiment of the present invention.

Below, detailed explanation will be given with reference to the flowchart of FIG. 6 for rendering processing executed on the PC 100 of the present embodiment. Additionally, it is assumed that the configuration of the PC 100 of the present embodiment is the same as that of the first embodiment. Also, for steps in the rendering processing of the present embodiment that perform processing that is the same as in the rendering processing of the first embodiment, the same reference numerals are attached, and explanation of these will be omitted.

In step S301, after a fragment number map having the same numbers of pixels as the rectangular image to be generated is generated, the rendering unit 104, in step S601, reduces the resolution of the fragment number map. This resolution reduction is performed considering the number for concurrent processing for the sorting processing in the rendering processing as explained above, for example. For example, in a case where the rendering unit 104 is configured so as to be able to execute the sorting processing for 16×16 pixels in parallel, processing is performed such that for a fragment number map of 7680×4320 pixels, a summation of the pixel values of 16×16 pixels becomes the pixel value for a single pixel after the conversion, and conversion into a low resolution fragment number map of 480×270 pixels is performed. In other words, because a single pixel of the low resolution fragment number map corresponds to 16×16 pixels of the rectangular image, it is possible to execute the sorting processing efficiently for each tile if the division is performed based on the low resolution fragment number map.

In step S602, the rendering unit 104, based on the low resolution fragment number map that is generated, constructs the summed area table and stores it in the memory 103. In step S603, the control unit 101 performs the tiling processing by referencing the summed area table constructed for the low resolution fragment number map.

In step S604, the control unit 101, based on the tiles defined for the low resolution fragment number map, identifies a corresponding pixel for the rectangular image, and defines a tile at the resolution of the rectangular image.

With such a configuration, it is possible to perform the tiling processing such that the rendering processing can be executed efficiently. Also, by reducing the resolution of the fragment number map, the computation amount for the generation of the summed area table can be reduced.

Additionally, in the present embodiment explanation was given for two-pass processing in which after the fragment number map is generated it is converted into a low resolution fragment number map, but the generation of the fragment number map may be performed so that the fragment number map is low resolution from the start. In other words, the numbers of fragments on straight lines defined by each pixel of the rectangular image and the viewpoint are counted, but in the generation of the low resolution fragment number map, processing may be performed in one pass such that a summation of a number of fragments of a corresponding pixel group is made to be a pixel value.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the control method thereof according to the present invention are realizable by a program executing the methods on one or more computers. The program is providable/distributable by being stored on a computer-readable storage medium or through an electronic communication line.

This application claims the benefit of Japanese Patent Application No. 2014-091918, filed Apr. 25, 2014, which is hereby incorporated by reference herein in its entirety.

What is claimed is:

1. An information processing apparatus that generates a rectangular image into which a 3D scene is rendered for a predetermined viewpoint, the information processing apparatus comprising:
    a processor; and
    a memory including instructions that, when executed by the processor, cause the processor to perform operations including:
        obtaining a number of fragments existing on a straight line defined by the viewpoint and a predetermined point within the 3D scene to be rendered for each pixel of the rectangular image;

dividing a two-dimensional region in a screen coordinate system corresponding to the rectangular image into a plurality of regions; and performing a predetermined rendering calculation for generating the rectangular area where each of the plurality of regions is taken as one unit of calculation, wherein the processor divides the two-dimensional region into the plurality of regions by at least one dividing line so that a difference of summations of the number of fragments included in each of the plurality of regions after the division becomes a minimum.

2. The information processing apparatus according to claim 1, wherein the processor divides the two-dimensional region into the plurality of regions by making a straight line orthogonal to at least one of a horizontal axis and a vertical axis, the at least one dividing line including the straight line.

3. The information processing apparatus according to claim 1, wherein the processor recursively divides the two-dimensional region until the summations of the number of fragments included in each region become less than or equal to a predetermined number of fragments.

4. The information processing apparatus according to claim 3, wherein the predetermined number of fragments is determined in accordance with a capacity of a storage region used for the predetermined rendering calculation.

5. The information processing apparatus according to claim 1, wherein the at least one dividing line includes a straight line, and the processor determines a direction of the straight line which divides an area to be the direction such that, for all regions of the area after division, a shape of the regions becomes closer to a square.

6. The information processing apparatus according to claim 1, wherein the processor generates a summed area table based on a two-dimensional image in which each pixel has the number of fragments obtained for a corresponding pixel of the rectangular image, and the processor calculates the summations of the number of fragments included in each of the plurality of regions after the division based on the summed area table generated by the processor.

7. The information processing apparatus according to claim 6, wherein the processor generates the summed area table based on an image obtained by causing a resolution of the two-dimensional image to be reduced.

8. The information processing apparatus according to claim 7, wherein the processor causes the resolution of the two-dimensional image to be reduced based on a number of pixels processed in parallel in the predetermined rendering calculation.

9. The information processing apparatus according to claim 1, further comprising:

a renderer which is able to render a corresponding region of the rectangular image by selecting each of the plurality of regions into which the processor divides the corresponding region.

10. The information processing apparatus according to claim 1, wherein the predetermined rendering calculation includes generating a linked-list for the plurality of regions, performing sorting processing for each pixel, performing shading processing, and rendering and outputting corresponding pixels for the rectangular image.

11. An information processing apparatus that generates a rectangular image into which a 3D scene is rendered for a predetermined viewpoint, the information processing apparatus comprising:

a processor; and a memory including instructions that, when executed by the processor, cause the processor to perform operations including:

obtaining a number of fragments existing on a straight line defined by the viewpoint and a predetermined point within the 3D scene to be rendered for each pixel of the rectangular image;

dividing a two-dimensional region in a screen coordinate system corresponding to the rectangular image into a plurality of regions; and performing a predetermined rendering calculation for generating the rectangular image where each of the plurality of regions is taken as one unit of calculation, wherein the processor divides the two-dimensional region into the plurality of regions by at least one dividing line so that a difference of summations of the number of fragments included in each of the plurality of regions after the division becomes less than or equal to a predetermined value.

12. A control method of an information processing apparatus that generates a rectangular image into which a 3D scene is rendered for a predetermined viewpoint, the control method comprising:

obtaining a number of fragments existing on a straight line defined by the viewpoint and a predetermined point within the 3D scene to be rendered for each pixel of the rectangular image;

dividing a two-dimensional region in a screen coordinate system corresponding to the rectangular image into a plurality of regions; and performing a predetermined rendering calculation for generating the rectangular image where each of the plurality of regions is taken as one unit of calculation, wherein in the dividing, the two-dimensional region is divided into the plurality of regions by are at least one dividing line so that a difference of summations of the number of fragments included in each of the plurality of regions after the division becomes a minimum.

13. A control method of an information processing apparatus that generates a rectangular image into which a 3D scene is rendered for a predetermined viewpoint, the control method comprising:

obtaining a number of fragments existing on a straight line defined by the viewpoint and a predetermined point within the 3D scene to be rendered for each pixel of the rectangular image;

dividing a region two-dimensional region in a screen coordinate system corresponding to the rectangular image into a plurality of regions; and performing a predetermined rendering calculation for generating the rectangular image where each of the plurality of regions is taken as one unit of calculation, wherein in the dividing, the two-dimensional region is divided into the plurality of regions by at least one dividing line so that a difference of summations of the number of fragments included in each of the plurality of regions after the division becomes less than or equal to a predetermined value.

14. A non-transitory computer-readable storage medium storing a program for causing one or more computers to function as the information processing apparatus according to claim 1.

15. A non-transitory computer-readable storage medium storing a program for causing one or more computers to function as the information processing apparatus according to claim 11.

* * * * *